June 18, 1935. B. F. W. HEYER 2,005,623
STORAGE BATTERY CHARGING RACK AND DISPLAY STAND
Filed July 22, 1931 3 Sheets-Sheet 1
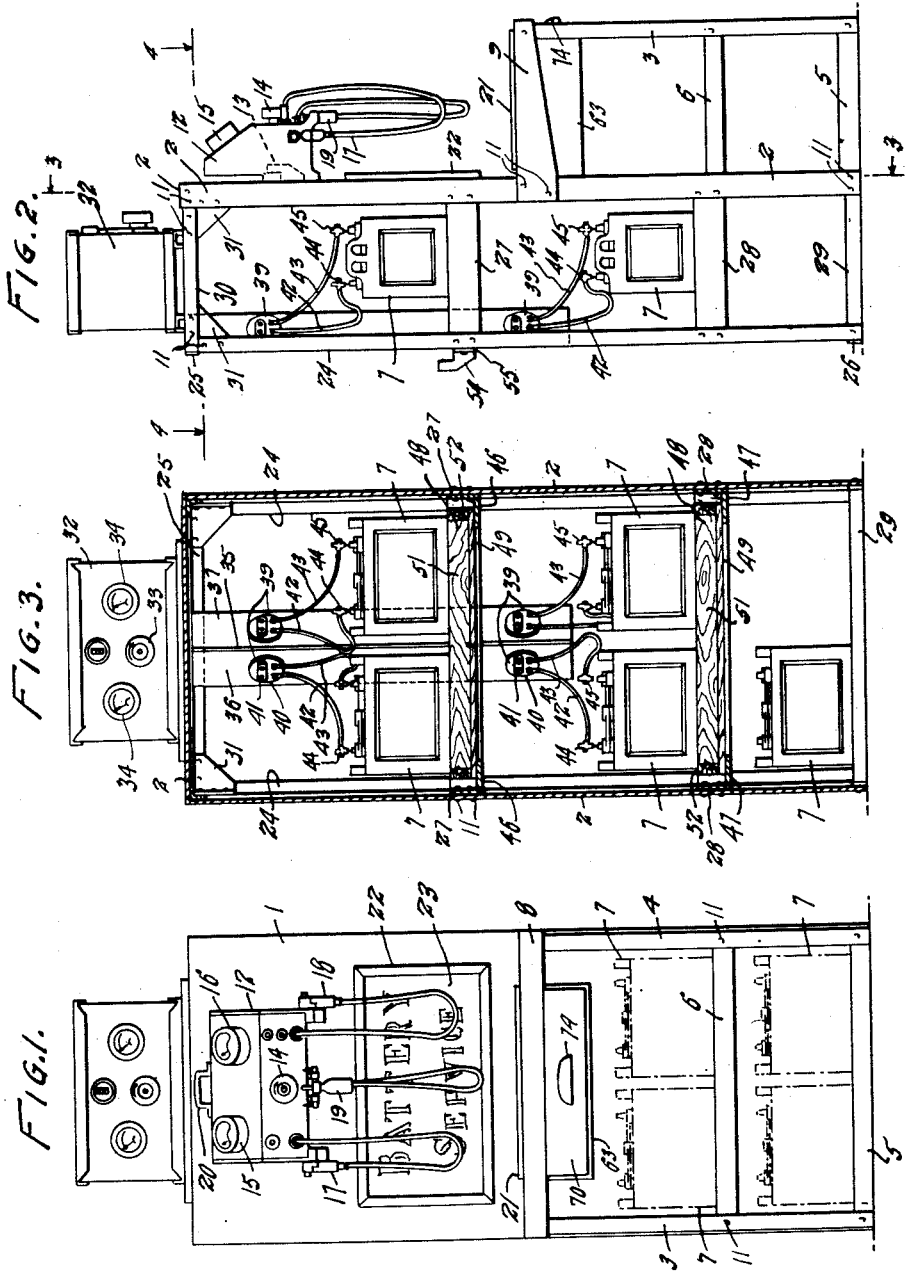
Inventor
BENJAMIN F. W. HEYER
By Semmes & Semmes
Attorneys June 18, 1935.  B. F. W. HEYER  2,005,623
STORAGE BATTERY CHARGING RACK AND DISPLAY STAND
Filed July 22, 1931  3 Sheets-Sheet 2
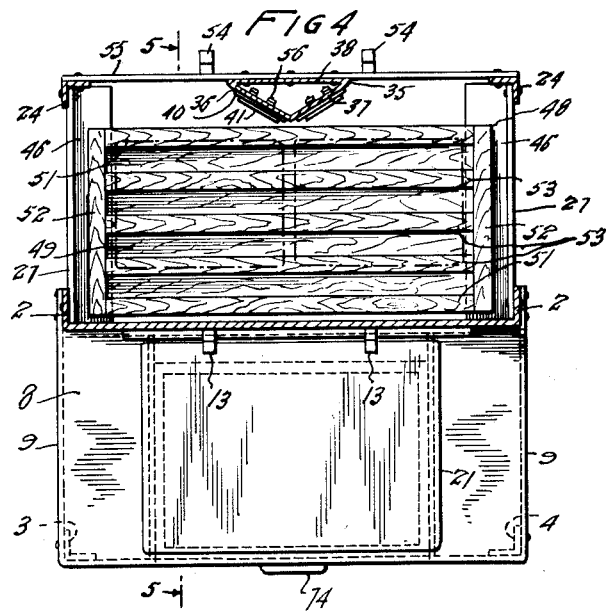
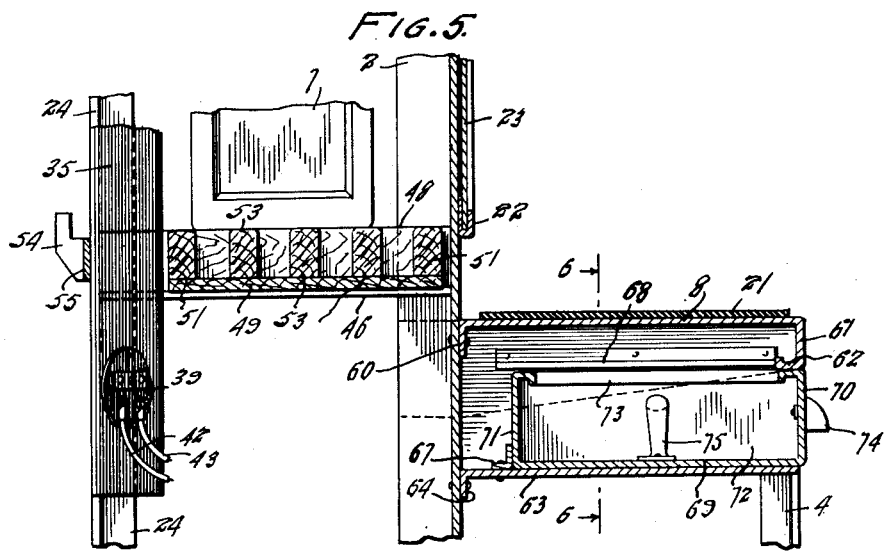
Inventor
BENJAMIN F. W. HEYER
By Semmes & Semmes
Attorneys June 18, 1935.  B. F. W. HEYER  2,005,623
STORAGE BATTERY CHARGING RACK AND DISPLAY STAND
Filed July 22, 1931   3 Sheets-Sheet 3
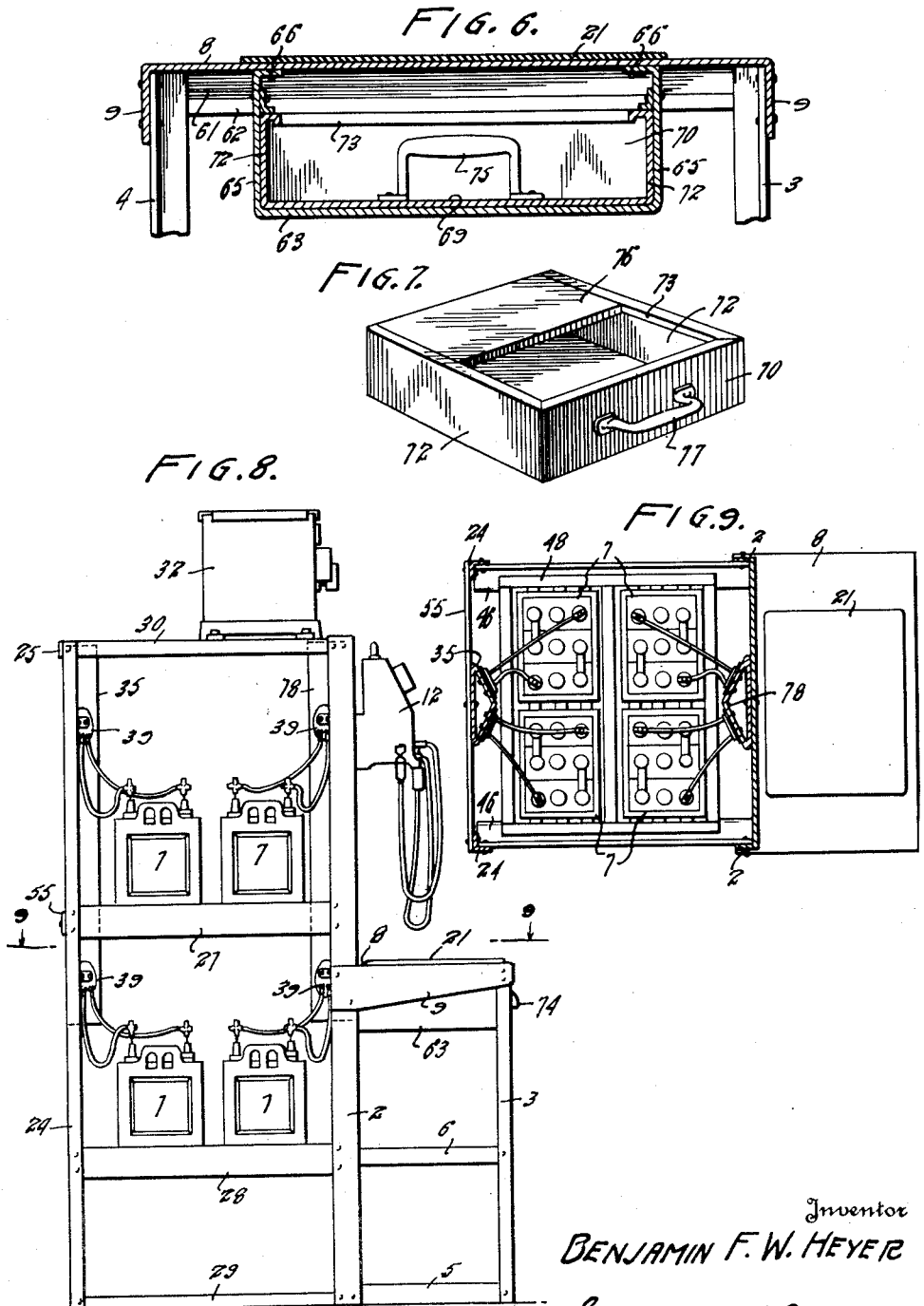
Inventor
BENJAMIN F. W. HEYER
By Semmes & Semmes
Attorneys Patented June 18, 1935

2,005,623

UNITED STATES PATENT OFFICE 2,005,623

STORAGE BATTERY CHARGING RACK AND DISPLAY STAND

Benjamin F. W. Heyer, Bloomfield, N. J., assignor to Atlas Supply Company, Newark, N. J., a corporation of Delaware Application July 22, 1931, Serial No. 552,530

4 Claims. (Cl. 136—173)

This invention relates in general to battery devices and more particularly has reference to a storage battery test display stock stand charging rack.

Previously to this time there has not been provided any apparatus wherein storage batteries may be conveniently tested and displayed and efficiently charged.

An object of this invention is to provide a storage battery test display stock stand charging rack.

Another object of this invention is to provide a stand for testing batteries.

Still another object of this invention is to provide a rack for charging batteries.

Still another object of this invention is to provide a stand and rack for testing batteries on the front thereof and charging batteries on the rear thereof.

Still another object of this invention is to provide a stand and rack having a battery tester mounted on the stand for testing batteries and a battery charger mounted on the rack for charging batteries.

Still another object of his invention is to provide a stand and rack, the stand including shelving, a table, front portion, a top, and shelving in the rear for displaying batteries, testing batteries, receiving the tester, receiving the charger and charging batteries.

A further object of this invention is to provide a stand and rack for testing batteries in the front and charging batteries in the rear thereof, wherein access to the battery under charge is allowed from the sides and the rear.

A further object of this invention is to provide a combined tool drawer and box.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawings, means for carrying the same into practical effect without limiting the improvements in their useful applications to the particular constructions, which for the purpose of explanation, have been made the subject of illustration.

In the drawings forming a part of this specification:

Figure 1 is a front view of my storage battery test display stock stand charging rack showing the test stand.

Figure 2 is a side view of my test display stock stand charging rack.

Figure 3 is a vertical sectional view taken on the line 3—3 of Figure 2, of my test display stock stand charging rack showing the charging rack.

Figure 4 is a sectional view taken on line 4—4 of Figure 2.

Figure 5 is a sectional view taken on line 5—5 of Figure 4.

Figure 6 is a sectional view taken on line 6—6 of Figure 5.

Figure 7 is a perspective view of my novel tool drawer and box.

Figure 8 is a side view of a modified form of test display stock stand charging rack for accommodating an additional number of batteries.

Figure 9 is a sectional view taken on line 9—9 of Figure 8.

Referring more particularly by numerals to the drawings, and especially to Figure 1, there is shown from the front my storage battery test display stock stand charging rack comprising a vertically positioned panel 1 preferably composed of any suitable sheet metal which may be coated with baked enamel. The sides and top of the panel 1 are bent over adjacent the edges to provide side and top flanges 2, as shown in Figure 4 (the top flange is not shown).

A pair of uprights 3 and 4 connected to the front of the panel 1 in alignment with the sides thereof and lower and intermediate shelving pieces 5 and 6 are adapted to accommodate storage batteries 7, shown in dotted line, for stock and display purposes. The uprights 4 are angular in cross section, as is shown in Figure 4, and a table piece 8 is adapted to be mounted on the tops thereof, the rear edge of the table piece being connected to the vertical panel 1 substantially intermediate its height. The rear edges of the shelving pieces 5 and 6 are similarly connected to the face of the panel 1 and the assembly of the shelving pieces, table piece and uprights 3 and 4 are reinforced by downturned lateral edges 9 of the table piece 8 connecting the tops of the uprights 3 and 4 and the flanges 2 of the panel piece 1.

The shelving pieces, table piece, uprights and panel are joined through any suitable fastening means such as by rivets 11.

A battery tester 12 is adapted to be removably mounted on the front of the panel 1 above the table piece 8. Hooks 13, as shown in Figure 2, suitably mounted on the front of the panel 1 may be provided for engaging receiving means on the battery tester for mounting of the same on the panel. The battery tester which may be of any conventional construction, comprises a switch 14, indicators 15 and 16, clamps 17 and 18, prod 19, and a handle 20 for carrying the tester when it is removed from the panel 1.

The table piece 8 is adapted to receive the battery which it is desired to test and is preferably provided with an insulator piece, such as a rubber mat 21. A frame piece 22 may be provided on the face of the panel 1 intermediate the table piece 8 and the tester 12 for receiving advertising matter or other descriptive literature 23.

The stock display test stand described is adapted to form a part of a charging rack as shown in Figures 2, 3, 4 and 5, comprising a pair of spaced uprights 24 connected by top and bottom cross members 25 and 26, as shown in Figure 2, and side members 27 and 28 as shown in Figure 3 to the side flanges 2 on the panel 1.

A bottom shelving piece 29 is further connected between the uprights and in addition a top table piece 30. The table piece, cross members and lower shelving piece are connected to the uprights by rivets 11 or other suitable fastening means in the same manner as has been described with reference to the construction of the stock display test stand. The mounting of the top table piece and front and rear cross members is reinforced by angular pieces 31 riveted therebetween. A battery charger 32 of conventional construction and connected to a suitable source of current, comprising a switch 33 and indicators 34 is adapted to be suitably mounted on the top of the table piece 30.

A panel 35 formed of side pieces 36 and 37, as shown in Figure 2, and a rear piece 38, as shown in Figure 4, is vertically mounted on the rear cross pieces 25 and a cross piece 55, in central relation to the rack terminating at the top under the table piece 30. The panel 35 is adapted to have a plurality of units 39 mounted thereon. These units comprise insulator disks 40, conductors 41 provided with a pair of apertures and leads 42 and 43 having connectors 44 and 45 connected to the ends thereof.

This panel arrangement is the same as is described in my copending application Serial No. 550,209 filed July 11, 1931, issued as Patent No. 1,970,091, dated August 14, 1924.

The leads 42 and 43 on each unit are adapted to be connected in series to conductors enclosed in the panel arranged in the circuit of the battery charger 32. The connectors 44 and 45 are adapted to be either fitted in the opposite terminals of the storage battery or in the apertures provided in the conductors 41 comprising part of each unit 39.

The side cross pieces 27 and 28 are formed with flanges 46 and 47 for receiving trays 48.

The trays 48 comprise bottom portions 49, side portions 51 and end portions 52, as shown in Figures 2, 4 and 5 adapted to be fitted on the flanges 46 and 47. Spaced wooden grids 53 are mounted in the trays for receiving storage battery 7 for connection in the battery charging circuit by insertion of the connectors 44 and 45 in the opposite terminals thereof. The wooden grids and the bottom end and side portions forming the trays are preferably coated with some material resistant to battery acid drippings for supporting batteries out of contact with drippings collected between the grids. The bottom shelving piece 29 is adapted to accommodate additional batteries 7 awaiting charge or which have been charged.

A pair of hooks 54 may be mounted on a rear cross piece 55, similar to the hooks 13 mounted on the front of the panel piece 1, for receiving the battery tester 12, which may be removed from the front panel 1 for testing batteries undergoing charge in the rack.

The operation of my test display stock stand charging rack will be readily understood from the foregoing description. The batteries 7 for storage or display purposes are accommodated on the shelving pieces 5 and 6 provided on the test display stock stand. When it is desired to test a battery, the same is adapted to be placed on the mat 21 provided on the table piece 8, where testing may easily be accomplished by connection of the clamps 17 and 18 or the prod 19 provided on the tester 12, thereto. The upper portion of the panel 1 having the hooks 13 mounted thereon provides for a convenient detachable connection for the tester 12.

Access to the charging rack in the rear of the test display stock stand is afforded from the sides or rear. The table piece 30 on the charging rack provides for the convenient mounting of the charger 32, which may be removably fitted on a frame formed of a pair of channel cross pieces 58 as shown in Figure 3. The charger connected to a suitable source of current is connected in series through conductors in the panel 35 to a plurality of leads 42 and 43 connected to a corresponding number of units 39, the units 39, as has already been described comprise insulator disks 40 having conductor blocks provided with a pair of apertures mounted thereon.

Connection of the conductors from the battery charger within the panel 35 to the leads 42 and 43 is adapted to be made through terminal pieces 26 as shown in Figure 4 extending through the insulator disks 40 for connection to the conductors within the panel 35 thereto and leads 42 and 43 on the outer ends thereof. Batteries 7 which it is desired to charge are adapted to be placed on the slats 53 fitted in the trays resting on the flanges 46 and the connectors 44 and 45 attached to the ends of the leads fitted in the opposite terminals thereof, closing the circuit with the charger through each battery.

If the connectors provided on the ends of the leads are not inserted in the opposite terminals of the battery, the same are adapted to be fitted in the apertures provided in the conductors 41 on each of the units 39, so as to close the circuit with the battery charger and not interrupt the charging of other batteries in the rack as is also shown in Figure 2.

When it is desired to test batteries undergoing charge, the tester 12 may be removed from the hooks 13 provided on the front of the panel 1 and mounted on the hooks 55 provided on the rear cross piece 54 on the charging rack. In this manner, access to the battery undergoing charge for connection of the clamps 17 and 18 or the jack 19 on the tester is easily afforded. It will be further appreciated that while the batteries undergoing charge are not exposed, having the stock display test stand positioned in front thereof, the battery charger mounted on the top of the rack is open to view at all times for observation of the indicators thereon.

A novel tool drawer and box may be mounted on the underside of the table 8 on the test display stock stand. The table 8, as shown in Figure 5, is formed with a downwardly projecting flange 60 on the rear edge for connection to the panel 1, and with a downwardly projecting flange 61 on the front edge horizontally flanged at the bottom as at 62. A support piece 63 having a downwardly projecting flange 64 formed on the rear edge for connection to the panel piece 1 is mounted below the table 8 in spaced relation thereto. The support piece 63 is formed with vertical side portions 65 as shown in Figure 6, having the top edges turned over as at 66 for connection to the underside of the table piece 8.

My novel tool drawer box is adapted to be fitted in the space provided between the support piece 63, the table piece 8 and the side portion 65 of the support piece 63. An angle stop piece 67 is mounted on the support piece 63 adjacent the rear thereof to limit rearward movement of my tool drawer box, and angle pieces 68 similarly mounted on the side pieces 65 of the support piece 63 to prevent upward movement thereof.

The tool drawer box is adapted to be fitted in the space provided between the table piece 8 and the support piece 63 comprising a bottom portion 69, front and back portions 70 and 71 and side portions 72. The top edges of the front and back and side portions are formed with inwardly projecting flanges 73 to prevent tools placed in the drawer box from falling out when the same is utilized as a tool box.

A handle 74 is mounted on the front 70 of the drawer box to facilitate the insertion and withdrawal of the same from between the table piece 8 and the support piece 63. A handle 75 is centrally mounted on the bottom portion 69 of the drawer box for carrying the same as a tool box. It will be appreciated that the receptacle described may be utilized as a drawer when fitted between the table piece 8 and the support piece 63, and inserted and withdrawn therefrom by grasping the handle 74, or the receptacle withdrawn and used as a tool box by grasping of the handle 75.

In Figure 7 is shown a modified form of tool drawer box wherein the handle 75 fixed on the bottom portion 68 thereof is dispensed with and a top piece 76 connected between the side edges 64 and the rear edge 70 of the drawer box substituted therefor. In this construction the receptacle may be used as a tool box by grasping a handle 77 fixed on the front thereof in place of the handle 74 in Figure 5, the handle 77 being of the same character as the handle 75 shown on the bottom of the box in Figure 5. The cover 76 prevents tools from falling out of the receptacle when carried by the handle 77.

In Figure 8 is shown a modified form of charging rack, designed to accommodate an additional number of batteries. In this construction the side pieces 27 and 28 and the top table piece 30 are lengthened and correspondingly the trays for receiving the batteries. An additional panel 78 having a plurality of units 39 mounted on the front thereof similar to the panel 35 is mounted on the inner face of the panel 1 opposite the panel 35 and connected to the charger in the same manner. The test display stock stand is similarly connected on the front of the charging rack. In increasing the dimensions of the charging rack and providing the additional panel 78, twice the number of batteries for charging may be accommodated. It will, of course, be understood that a charger 32 having sufficient capacity to charge the added number of batteries may be substituted for the four-battery charger described.

There is accomplished by this invention a storage battery test display stock stand charging rack whereon storage batteries may be conveniently displayed, tested and charged, the test stand being provided with a novel tool box drawer with a charging rack being capable of modification to accommodate an additional number of batteries for charging.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. A combined storage battery charging rack and display stand comprising a vertically disposed imperforate panel, rear uprights of substantially the same height as the panel arranged at one side thereof, superposed horizontal shelf members rigidly connected to the panel and rear uprights, a battery charger element supported by one of said shelf members, non-corrosive trays supported by said shelf members and containing rigid non-corrosive grids on which batteries may rest during charging, each tray having an endless boundary wall of substantially the same height as the grids electric conductors leading from said element to points adjacent to the grids adapted to be attached to batteries to be charged, shorter uprights positioned forwardly of the panel and rigidly connected to the latter, a table member supported by the shorter uprights and panel and adapted to support a battery while the latter is being tested, and battery display shelves arranged beneath the table member and connected to the panel and shorter uprights.

2. A combined storage battery charging rack and display stand comprising a vertically disposed imperforate panel, rear uprights of substantially the same height as the panel arranged at one side thereof, superposed horizontal shelf members rigidly connected to the panel and rear uprights, a battery charger element supported by one of said shelf members, non-corrosive trays supported by said shelf members and containing rigid non-corrosive grids on which batteries may rest during charging, each tray having an endless boundary wall of substantially the same height as the grids electric conductors leading from said element to points adjacent to the grids adapted to be attached to batteries to be charged, shorter uprights positioned forwardly of the panel and rigidly connected to the latter, a table member supported by the shorter uprights and panel and adapted to support a battery while the latter is being tested, battery display shelves arranged beneath the table member and connected to the panel and shorter uprights, and a battery tester supported by the panel and arranged above said table member.

3. A combined storage battery charging rack and display stand comprising a vertically disposed imperforate panel, rear uprights of substantially the same height as the panel arranged at one side thereof, superposed horizontal shelf members rigidly connected to the panel and rear uprights, a battery charger element supported by one of said shelf members, non-corrosive trays supported by said shelf members and containing rigid non-corrosive grids on which batteries may rest during charging, each tray having an endless boundary wall of substantially the same height as the grids electric conductors leading from said element to points adjacent to the grids adapted to be attached to batteries to be charged, shorter uprights positioned forwardly of the panel and rigidly connected to the latter, a table member supported by the shorter uprights and panel and adapted to support a battery while the latter is being tested, battery display shelves arranged beneath the table member and connected to the panel and shorter uprights, and a battery tester detachably mounted on the panel and positioned above the table member.

4. A combined storage battery charging rack and display stand comprising a vertically disposed imperforate panel, rear uprights of substantially the same height as the panel arranged at one side thereof, superposed horizontal shelf members rigidly connected to the panel and rear uprights, a battery charger element supported by one of said shelf members, non-corrosive trays supported by said shelf members and containing rigid non-corrosive grids on which batteries may rest during charging, each tray having an endless boundary wall of substantially the same height as the grids electric conductors leading from said element to points adjacent to the grids adapted to be attached to batteries to be charged, shorter uprights positioned forwardly of the panel and rigidly connected to the latter, a table member supported by the shorter uprights and panel and adapted to support a battery while the latter is being tested, battery display shelves arranged beneath the table member and connected to the panel and shorter uprights, a battery tester detachably mounted on the panel above the table member, and supports for said battery tester carried by the rear uprights to permit a battery to be tested while it is undergoing charging.

BENJAMIN F. W. HEYER.